United States Patent
Rivot et al.

(10) Patent No.: US 12,304,085 B2
(45) Date of Patent: May 20, 2025

(54) CLIFF DETECTION IN ROBOTIC DEVICES

(71) Applicants: STMICROELECTRONICS LTD, Kowloon (HK); STMicroelectronics (Shenzhen) R&D Co., Ltd., Shenzhen (CN)

(72) Inventors: Benoit Rivot, Bessy (FR); Xingyu Wang, Shenzhen (CN)

(73) Assignees: STMicroelectronics (Shenzhen) R&D Co. Ltd., Shenzhen (CN); STMICROELECTRONICS LTD., Kowloon (HK)

( * ) Notice: Subject to any disclaimer, the term of this patent is extended or adjusted under 35 U.S.C. 154(b) by 439 days.

(21) Appl. No.: 17/661,899

(22) Filed: May 3, 2022

(65) Prior Publication Data

US 2023/0356397 A1   Nov. 9, 2023

(51) Int. Cl.
    B25J 9/16    (2006.01)
(52) U.S. Cl.
    CPC ............. B25J 9/1666 (2013.01); B25J 9/163 (2013.01); B25J 9/1694 (2013.01)
(58) Field of Classification Search
    None
    See application file for complete search history.

(56) References Cited

U.S. PATENT DOCUMENTS

| 11,029,700 | B2 | 6/2021 | Shin et al. |
| 11,169,533 | B2 | 11/2021 | Haegermarck et al. |
| 2012/0185096 | A1 | 7/2012 | Rosenstein et al. |
| 2015/0334371 | A1 | 11/2015 | Galera et al. |
| 2019/0193267 | A1 | 6/2019 | Peng et al. |
| 2020/0356101 | A1 | 11/2020 | Wang et al. |
| 2020/0409382 | A1 | 12/2020 | Herman et al. |
| 2021/0089040 | A1* | 3/2021 | Ebrahimi Afrouzi ........................ G05D 1/0248 |
| 2021/0302964 | A1 | 9/2021 | Lai |
| 2021/0331713 | A1* | 10/2021 | Orlov ..................... G01S 7/4808 |
| 2022/0009759 | A1* | 1/2022 | Purohit ................... G01S 17/42 |
| 2022/0043128 | A1* | 2/2022 | Pacala ..................... G01S 17/89 |
| 2023/0371769 | A1* | 11/2023 | Kwak ........................ B25J 9/16 |
| 2024/0077586 | A1* | 3/2024 | Lee ........................ G01S 17/931 |

FOREIGN PATENT DOCUMENTS

| WO | 0004430 A1 | 1/2000 |
| WO | 2007041295 A2 | 4/2007 |

* cited by examiner

*Primary Examiner* — Jonathan L Sample
*Assistant Examiner* — Alan Lindsay Ostrow
(74) *Attorney, Agent, or Firm* — Slater Matsil, LLP (57) ABSTRACT

Cliff Detection in Robotic Devices A method of operating a robotic device includes: moving the robotic device towards an edge of a cliff while a ToF sensor senses reflected signals having been transmitted by the ToF sensor, the reflected signals being generated by the signals transmitted by the ToF sensor being reflected off a target object back to the ToF sensor, the ToF sensor being attached to a front of the robotic device and including an array of single-photon avalanche diode (SPAD) sensors; comparing a statistical distribution of the reflected signals received at a plurality of different rows of zones configured by the array of SPADs in a region of interest (ROI) of the ToF sensor and based on the comparing detecting an approaching of the edge of the cliff; and in response to detecting the approaching of the edge, changing a propulsion of the robotic device before reaching the edge.

21 Claims, 9 Drawing Sheets

CLIFF DETECTION IN ROBOTIC DEVICES

TECHNICAL FIELD

The present invention relates generally to a system and method for cliff detection in robotic devices.

BACKGROUND

Generally, robots have been developed for industrial use, and in particular, factory automation. In recent years as the field of robotics has developed robots have been developed for use at home. A represented example of a home robot is a cleaning robot. A cleaning robot may be a mobile robot programmed to drive throughout an area of the home and remove dust and small foreign objects in its path. A cleaning robot may be configured to clean a predetermined area using a predetermined path or may be autonomously driven.

However, mobile robotic devices, such as home robots, come with their own set of disadvantages. Mobile robotic devices must be aware of their environment. Some environmental features, such as cliffs (e.g. steps in stair wells) may be dangerous to the integrity of the robot, the user, or the environment. For example, if the robot fails to detect a cliff it can fall off the cliff.

Typically, in order to detect a cliff, a sensor or a camera may be attached under the mobile robot. However, because the sensor or camera is attached under the chassis of the mobile robot, the mobile robot cannot detect the cliff until a portion of its body is physically over the edge of the cliff. In other words a mobile robot is not able to change its path until a portion of it physically extends over the cliff. Because the portion of the robot has to be physically over the cliff, the robot must move at low speeds in order to give the robot time to detect the cliff and change its path before it falls over the cliff. The slow speeds and the inability to anticipate the path of the mobile robot, results in an inefficient mobile robot.

SUMMARY

In accordance with an embodiment of the present invention, a method of operating a robotic device includes: moving the robotic device towards an edge of a cliff while a ToF sensor senses reflected signals having been transmitted by the ToF sensor, the reflected signals being generated by the signals transmitted by the ToF sensor being reflected off a target object back to the ToF sensor, the ToF sensor being attached to a front of the robotic device and including an array of single-photon avalanche diode (SPAD) sensors; comparing a statistical distribution of the reflected signals received at a plurality of different rows of zones configured by the array of SPADs in a region of interest (ROI) of the ToF sensor and based on the comparing detecting an approaching of the edge of the cliff; and in response to detecting the approaching of the edge, changing a propulsion of the robotic device before reaching the edge.

In accordance with an embodiment of the present invention, a method for operating a robotic device includes: transmitting signals from an array of SPAD sensors while the robotic device is in motion, the array of SPAD sensors being attached to a front of the robotic device; receiving reflected signals by a plurality of zones configured by the array of SPADs while the robot is in motion, the reflected signals being generated by the transmitted signals being reflected off of a target to the array of SPADs; detecting an approaching edge of a cliff from three different ranges of distance while the robotic device is in motion based on a statistical distribution of the reflected signals; and in response to detecting the approaching edge of a cliff from at least one of the three ranges of distance, changing a path of the robotic device.

In accordance with an embodiment of the present invention, a robotic device includes: a time of flight (ToF) sensor including an array of SPAD sensors attached to a front robotic device; a controller; and a memory for storing a program to be executed in the controller, the program including instructions when executed cause the controller to: move the robotic device towards an edge of a cliff while the ToF sensor senses reflected signals having been transmitted by the ToF sensor, the reflected signals being generated by the signals transmitted by the ToF sensor being reflected off a target object back to the ToF sensor; compare a statistical distribution of the reflected signals received at a plurality of different rows of zones configured by the array of SPADs in a region of interest (ROI) of the ToF sensor and based on the comparing detecting an approaching of the edge of the cliff; and in response to detecting the approaching of the edge, change a propulsion of the robotic device before reaching the edge.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1A-1C illustrate schematic diagrams of a mobile robot according to an embodiment of the present application, wherein FIG. 1A illustrates a schematic diagram of a mobile robot according to an embodiment of the present application.

FIGS. 2A-2D illustrate schematic illustrations of a mobile robot anticipating the edge of a cliff while in motion at three different distance ranges, where FIG. 2B illustrates the mobile robot detecting the edge of the cliff from a long distance range.

DETAILED DESCRIPTION OF ILLUSTRATIVE EMBODIMENTS

In recent years, the field of robotics has developed mobile robots for non-factory uses. For example, cleaning robots have been developed for home use. A cleaning robot may be a mobile robot programmed to drive throughout an area of the home and clean dust and small foreign objects in its path. A cleaning robot may be configured to clean a predetermined area using a predetermined path or may be autonomously driven.

However, mobile robotic devices, such as home robots, come with their own set of disadvantages. Mobile robotic devices must be aware of their environment. Some environmental features, such as cliffs (e.g. steps) may be dangerous to the integrity of the robot, the user, or the environment. For example, if the robot fails to detect a cliff it can fall off the cliff.

Conventional mobile robots include sensors attached to the bottom of a robot, or a camera to detect a cliff. However, when sensors such as ultra-sonic cliff detectors, PIR, or single zone ToF sensors attached to the bottom of a robot are used, mobile robots cannot detect the cliff until a portion of its body is physically over the edge of the cliff. In other words, a mobile robot is not able to change its path until a portion of it physically extends over the cliff resulting in a slow moving inefficient robot. On the other hand, cameras require complex camera systems to detect a cliff and cannot provide information about the distance to the cliff.

Embodiments of the present application relate to a mobile robot that utilizes a time of flight (ToF) sensor that can be used to anticipate an approaching edge of a cliff from three different distance ranges. Advantageously this allows for the mobile robot to travel at faster speeds by changing its propulsion prior to reaching the cliff, resulting in a more efficient mobile robot.

Figure 1A:
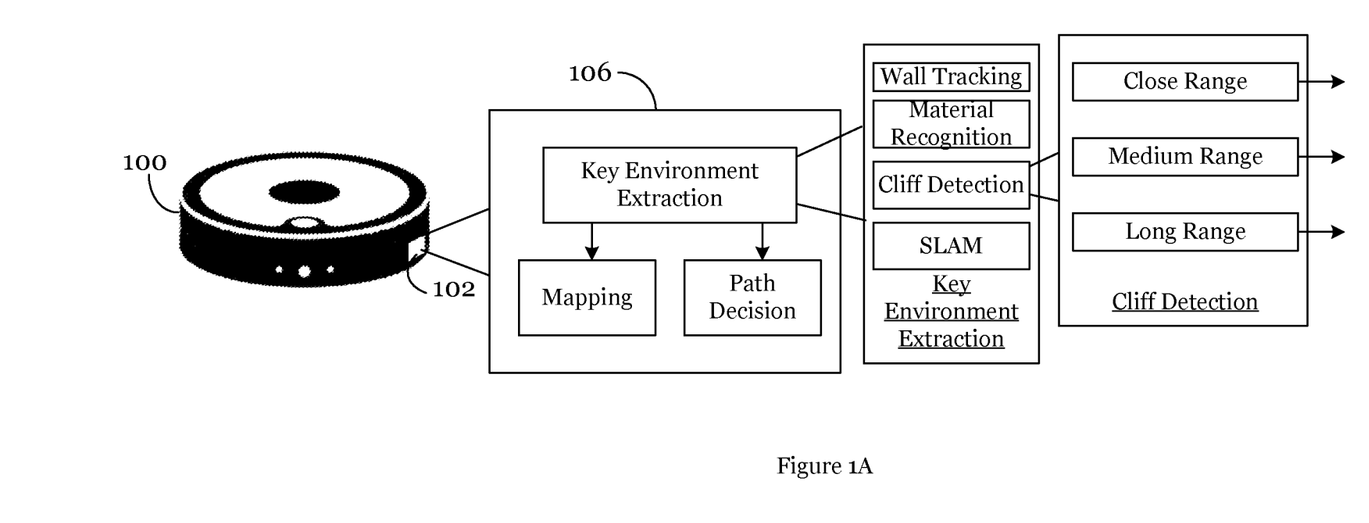
Figure 1B:
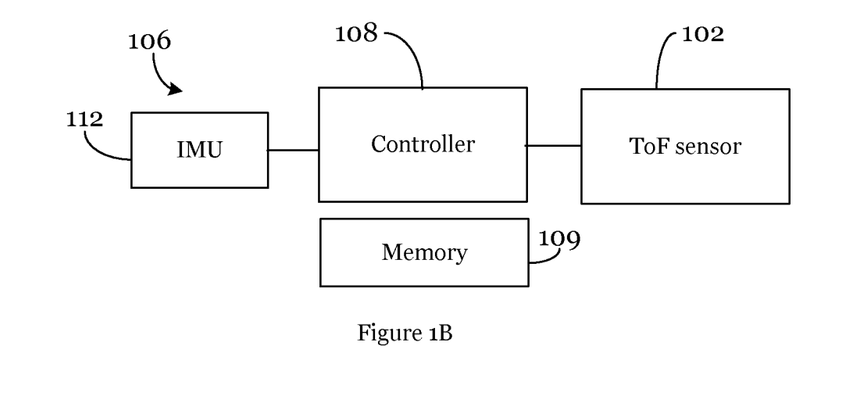
FIG. 1B illustrates a schematic diagram of a navigation system of the navigation system of the mobile robot.
Figure 1C:
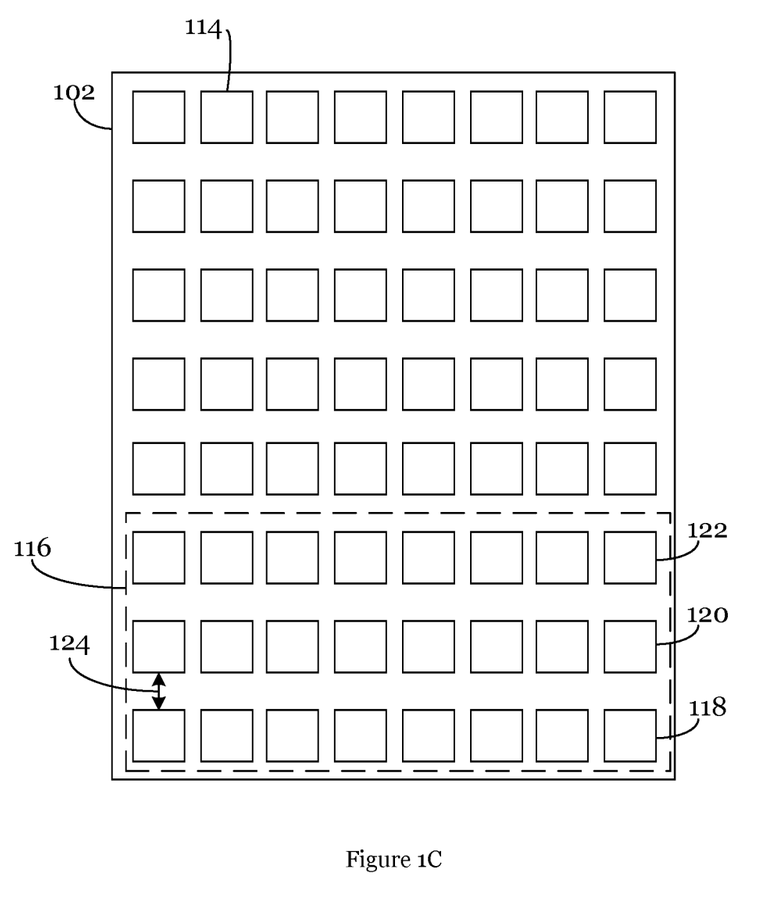
FIG. 1C illustrates a front view of the ToF sensor used to anticipate the edge of a cliff.

FIGS. 1A-1C illustrate schematic diagrams of a mobile robot according to an embodiment of the present application, wherein FIG. 1A illustrates a schematic diagram of a mobile robot according to an embodiment of the present application, FIG. 1B illustrates a schematic diagram of a navigation system of the mobile robot, and FIG. 1C illustrates a schematic diagram of the ToF sensor used to anticipate the edge of a cliff.

Referring to FIG. 1, a mobile robot 100 may include a time of flight (ToF) sensor 102 attached to the front of it. In various embodiments, the ToF sensor 102 may include an array of single photon avalanche diode (SPAD) devices. Details on the ToF sensor 102 will be described in more detail below.

In various embodiments, the mobile robot may be an automatic guided vehicle (AGV). The mobile robot 100 may be any type of mobile robot 100 known in the art. Although the mobile robot 100 is illustrated as a mobile vacuum cleaner this is for example purposes only.

In various embodiments, the ToF sensor 102 may be part of a navigation system 106 used for navigation of the mobile robot 100. Based on the data collected from the ToF sensor 102, the navigation system 106 may be used to extract key environment artifacts (target objects and obstacles) which may be used to map and make path decisions for the mobile robot 100 based on the data collected by the ToF sensor 102.

In various embodiments, key environment extraction may include wall tracking, material recognition, SLAM, and cliff detection.

The inventors of the application have identified using sensors attached to the bottom of a robot only allow mobile robots to detect a cliff when a portion of its body is physically over the edge of the cliff. Therefore, mobile robots are unable to anticipate a cliff before reaching it, a mobile robot is not able to change its path until a portion of it physically extends over the cliff. On the other hand, cameras used to detect a cliff require complex camera systems and cannot provide information about the distance to the cliff.

Advantageously, embodiments of the present application use a multi zone ToF sensor 102 comprising an array of SPAD devices (SPAD sensor) to anticipate an approaching edge of the cliff. As illustrated in FIG. 1A, the array of SPADs allow the mobile robot 100 to detect a cliff at three different ranges of distance: long range, medium range, and short range distances. One advantage of this is that it allows the mobile robot 100 to move at increased speeds because it can anticipate a cliff before it reaches it. Another advantage of anticipating a cliff is that the path of the mobile robot 100 may be optimized ahead of time.

Another advantage of using a multi zone ToF sensor is that the multi zone ToF sensor is able to track multiple target objects, such as a wall, the ground, an obstacle, and the like concurrently using a single sensor. The single multi zone ToF sensor 102 may be used by the controller to perform wall tracking, material recognition, cliff detection, and SLAM. In other words, the mobile robot 100 may navigate its environment using only the ToF sensor 102.

FIG. 1B illustrates a schematic view of a navigation system 106 of the mobile robotic device 100 according to an embodiment of the present application.

Referring to FIG. 1B the navigation system 106 may comprise a controller 108, an inertial measurement unit (IMU) 112, and the ToF sensor 102.

As described above the ToF sensor 102 may be a multi zone ToF sensor 102 comprising an array of SPAD sensors. In other words, the ToF sensor 102 may comprise a plurality of SPAD sensors arranged in row and columns in a matrix formation. For example, the ToF sensor may be multi-zone ToF sensors such as the ones manufactured by ST Microelectronics, or any other multi-zone ToF sensor known in the art.

Each of the SPAD sensors may be configured to emit signals and collect and transmit data to the controller 108 based on signals reflected off target objects. Because the ToF sensor 102 is attached to the front of the robotic device 100, the SPAD sensors may reflect signals off different objects on the mobile robot's 100 path. For example, because of the position of the ToF sensor 102 and because it is a multi-zone ToF sensor 102, the array of SPAD sensors may detect a side wall for wall tracking, the ground, the edge of a cliff, or any other objects in the path of the robotic device 100. In other words, instead of using sensors attached under the mobile robot 100, the ToF sensor 102 can detect multiple target objects along the path of the mobile robot 100 from a single sensor.

Based on the reflected signal received at each of the SPAD sensors, the mobile robot 100 is able to anticipate an edge of the cliff before it reaches it. In other words, based on the received reflected signals, the controller 108 generates a map of the room in which the robotic device 100 is navigating, and decide/change its travel path while in motion. For example, the controller 108 may comprise a processor, microprocessor, or any other type of controller known in the art. The controller 108 may be configured to analyze information and carry out a series of executable scripts, e.g., stored in a memory 109. The memory 109 may be integrated in the controller 108 or may be separate. In various embodiments, the memory 109 may be programmed for short term and/or long term memory storage. The memory 109 may be configured to store data generated by the controller 108 and may comprise various programs to be executed in the controller 108. The memory 109 may include both volatile and non-volatile memories.

In various embodiments, the IMU 112 may be in communication with the controller 108. The IMU 112 may comprise gyroscopes and accelerometers to measure and monitor a moment of inertia of the mobile robot 100 with respect to the overall center of gravity of the mobile robot 100. The controller 108 may monitor the signal provided by the IMU 112. The controller 108 may monitor the signal provided by the IMU 112 to determine any deviations from a threshold signal corresponding to normal operation of the mobile robot 100. If the controller 108 detects any deviations, it may take urgent action to ensure safe operation of the mobile robot 100. For example, if the robot pitches away from an upright position or is impeded in another manner, the controller 108 may take evasive maneuvers.

FIG. 1C illustrates the time of flight (ToF) sensor 102 according to an embodiment of the present application. The ToF sensor 102 may comprise a plurality of single photon avalanche diode (SPAD) sensors. The plurality of SPAD sensors may be formed in an array. The array of SPAD sensors may formed in rows and columns in a matrix like formation. The array of SPAD sensors may form a plurality of zones 114. The array of SPAD sensors are subzones of the plurality of zones. Although the array of SPAD sensors forms zones 114 that are arranged in eight rows and columns, the number zones 114 formed by the SPAD array are not limited by this application. The quantity of SPAD sensors used in the SPAD array are not limited by this application.

In various embodiments, a region of interest (ROI) 116 of the SPAD array may be used to anticipate an edge of a cliff. The ROI 116 may comprise a group of rows of zones 114. In various embodiments, the ROI 116 may include at least two consecutive rows of zones 114 and include the bottom row. For example, the ROI 116 may comprise the bottom three rows of zones 114. In various embodiments, a spatial separation 124 between the rows of the zones 114 may be leveraged to anticipate a cliff. Based on a statistical distribution between signal received by the different rows of zones 114 in the ROI 116 and the spatial separation 124, the mobile robot 100 may anticipate a cliff. This will be described in more detail below.

For example, as illustrated in FIG. 1C, the ROI 116 may include a first row 118, a second row 120, and a third row 122. The first row 118 may be the bottom row of the SPAD array. The second row 120 may be the second to bottom row of the SPAD array. The third row 122 may be the third to bottom row of the SPAD array. Although, the three rows are included in the ROI 116, this is for example purposes only. Any quantity of rows may be included in the ROI 116.

Figure 2A:
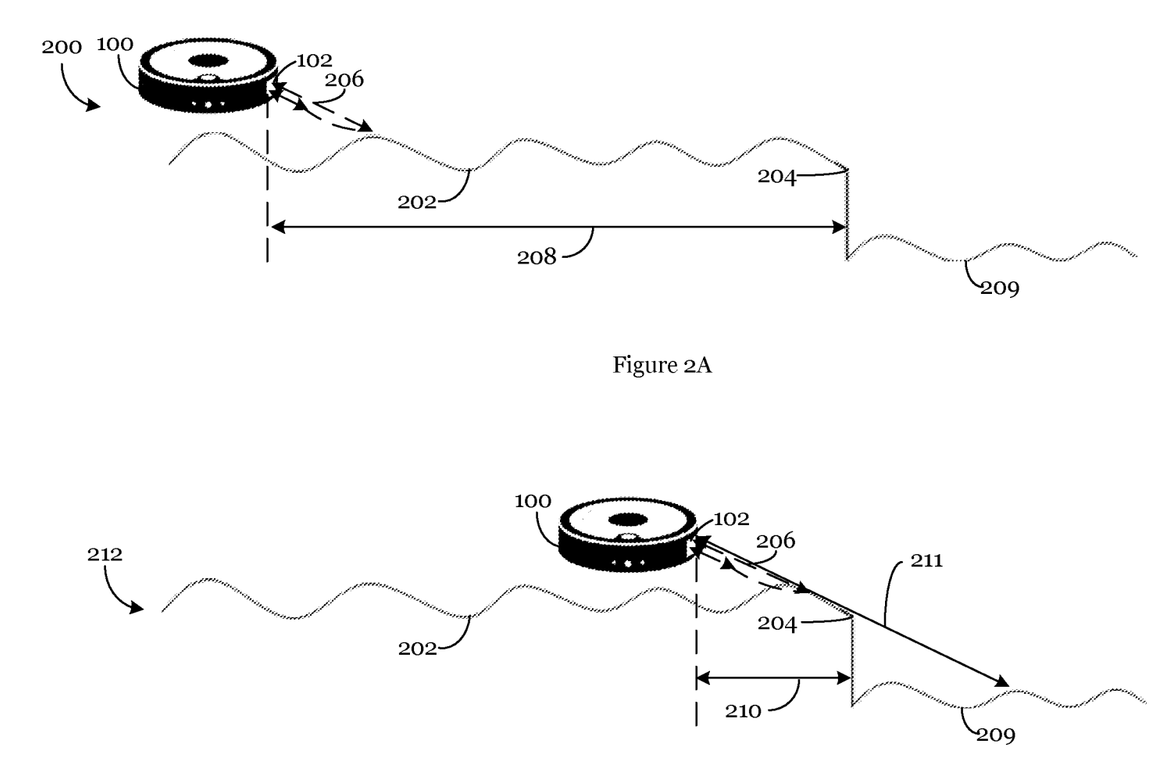
FIG. 2A illustrates the mobile robot traveling within a distance range sufficiently far enough away from the edge such that the edge may not be detected.
Figure 2C:
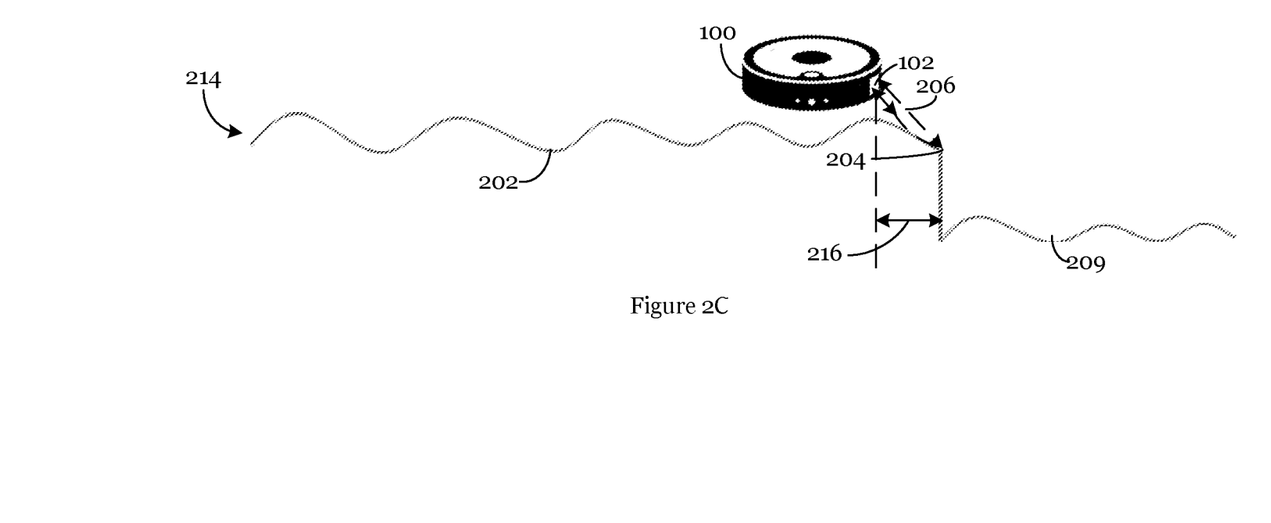
FIG. 2C illustrates the mobile robot detecting the edge of the cliff from a medium distance range.
Figure 2D:
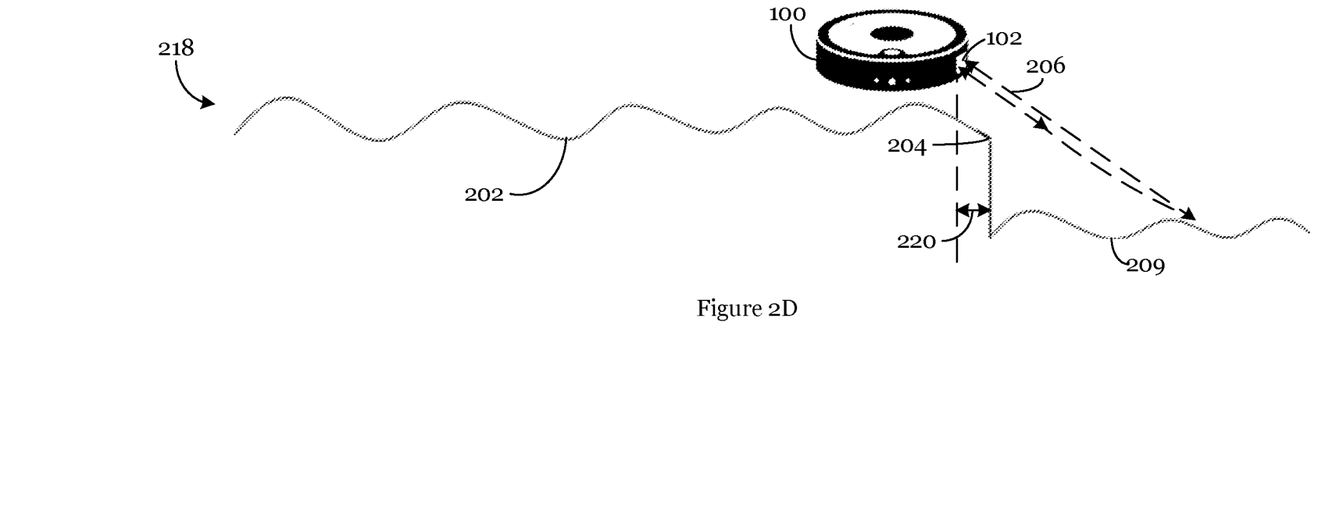
FIG. 2D illustrates the mobile robot detecting the edge of the cliff from a short distance range.

FIGS. 2A-2D illustrate schematic illustrations of a mobile robot anticipating the edge of a cliff while in motion at three different distance ranges, where FIG. 2A illustrates the mobile robot traveling within a distance range sufficiently far enough away from the edge such that the edge may not be detected, FIG. 2B illustrates the mobile robot detecting the edge of the cliff from a long distance range, FIG. 2C illustrates the mobile robot detecting the edge of the cliff from a medium distance range, and FIG. 2D illustrates the mobile robot detecting the edge of the cliff from a short distance range.

Referring to FIGS. 2A-2D, the mobile robot 100 is traveling on the ground 202 towards an edge 204 of a cliff (e.g. a stair). There are no other obstacles between the mobile robot 100 and the edge 204 in this example to clearly describe the embodiment.

In various embodiments, the ToF sensor 102 may be able to anticipate the edge 204 based on statistical distributions of reflected signals received. In other words, the ToF sensor 102 may be able to anticipate the edge 204 based on distances between each row of zones 114 in the region of interest (ROI) 116 and the ground 202 (i.e. the ground distance), and the peak rate of the intensity of light captured by each row of zones 114 in the ROI 116.

As the mobile robot 100 is in motion the ToF sensor 102 may be used to determine the distance between it and the ground (i.e. the ground distance) from multiple zones. In other words, the controller 108 may determine the distance between each zone 114 and the ground 202. The ground distance for each zone 114 in the ROI 116 may be determined by measuring the amount of time it takes for transmitted signals to reflect off the ground 202 back to the zones 114. For sake of clarity in understanding, the roughness of the ground 202 is shown magnified.

The median of the ground distances determined for each row of zones 114 in the ROI 116 may be used to anticipate the edge 204 from a medium range distance and a short range distance. In other words, the median ground distance of a row may be determined by taking the median of the ground distances measured by each zone 114 in said row. The median ground distance of each row in the region of interest (ROI) 116 may be monitored by the controller 108 while the mobile robot 100 is in motion.

The peak rate of the intensity of light captured by each row of zones 114 in the region of interest (ROI) 116 may be used to anticipate the edge 204 from a long range distance. The peak intensity of light for a row of zones 114 may be equal to average rate of the intensity of light captured over a row of zones 114.

The ranges of each respective range of detection may be defined by the height of the ToF sensor 102 measured from the ground. The higher the ToF sensor 102 is from the ground the longer the lower bound of each distance range may be. The ToF sensor 102 may be attached to the robotic device 100 so that it is between 5 cm to 7 cm from the ground, for example, 6 cm.

Referring to FIG. 2A, a first schematic diagram 200 illustrates when the mobile robot 100 is traveling within a distance range 208 sufficiently far enough away from the edge 204 such that the edge 204 may not be detected. When within distance range 208, the field of view 206 of the zones 114 in the region of interest (ROI) 116 is only detecting the ground 202 in front of the mobile robot 100. In other words, due to the ToF sensor 102 being positioned on the front of the mobile robot 100, each of the zones 114 in the ROI 116 are receiving signals reflected off the ground 202 in front of the mobile robot 100. While within distance range 208, the field of view 206 of the zones 114 in the ROI 116 is too far away from the edge 204 to detect it and is only detecting flat ground. Therefore, the median ground distances measured for each row in the ROI 116 remain at a constant value within the distance range 208.

Due to the spatial separation 124 between each row of zones 114, the lower the row is on the ToF sensor 102, the shorter the distance from the row to the ground 202. Therefore, the median ground distance of the third row 122 will be higher than the median ground distance of the second row 120, which also has a higher median ground distance than the first row 118. This will be described in more detail below.

Similarly, while within the distance range 208, the peak rate of the intensity of light captured by each row of zones 114 may be different for each row based on the spatial separation 124 between the rows. Similar to the manner discussed above, the lower the zone 114 is on the ToF 102 sensor the greater the intensity of the signal received. In other words, because reflected signals have to travel farther to rows higher on the ToF sensor 102, the lower the row, the higher the intensity of the received signal. Therefore, within the distance range 208, the first row 218 has a higher peak intensity than the second row 120 which has a higher peak intensity than the third row 122. Also because the intensity drops off as a square of the distance, this is a lot more sensitive than the measured distances. This will be described in more detail below.

Referring to FIG. 2B, a second schematic diagram 212 illustrates when the mobile robot 100 is traveling within a long distance range 210 from the edge 204. While the mobile robot 100 is within the long distance range 210, it may be able to anticipate the presence of the edge 204.

While the mobile robot 100 approaches the edge 204 within the long distance range 210, the zones 114 are still sensing the ground 202 in front of it. Therefore, in the long distance range 210 there should be little to no variation in each of the median ground distances. However, in some embodiments, due to the field of view beginning to detect a lower ground 202 due to the edge 204, there may be slight, but not very noticeable decreases in the median ground distances.

In addition, as the mobile robot 100 is approaching the edge 204 because the third row 122 is higher on the ToF sensor 102, part of the signal reflected back to the third row 211 may be reflected by the lower ground past the edge 209. Therefore, the peak intensity of light received by the third row 122 may decrease relative to the first row 118. In other words, the peak intensity sensed by third row 122 may decrease because it is receiving a reduced amount of reflected light due to the edge 204 of the cliff.

If the peak intensity of light received by the third row 122 decreases to a factor below an ambient value, the mobile robot 100 may detect the edge 204 from the long distance range 210. The factor may be between five and one hundred times the ambient rate, for example fifty time below the ambient rate. This will be described in more detail below.

In the same manner described above, due to their lower positions, the peak intensity of the second row 120 may decrease next, and then the first row 118 may decrease last as the mobile robot 100 approaches the edge 204 from the long distance range 210. The second row 120 and first row 118 falling below the factor of the ambient rate may confirm the anticipation of the edge 204 from the long distance range 210. In various embodiments the long distance range 210 may be between 30 cm and 60 cm from the edge 204, for example 45 cm.

Referring to FIG. 2C, a third schematic diagram 214 illustrates when the mobile robot 100 is within a medium distance range 216 from the edge 204. While the mobile robot 100 is within the medium distance range 216, it may be able to detect the presence of the edge 204.

When the mobile robot 100 is within a medium distance range 216 from the edge 204, the differences between the median ground distances may be used to anticipate the edge 204. Once the mobile robot 100 is within the medium distance range 216, the field of view 206 of the ToF sensor 102 may be detecting the edge 204. As each of the rows of zones 114 begin detecting the edge 204 their median ground distances all may begin the decrease. Once each of the region of interest (ROI) 116 begin detecting the edge 202, their median ground distances will all begin to converge towards a same value. The median ground distances of the rows in the rows of interest being equal, or close to equal may indicate the edge 204 from the medium distance range 216. For example, if the differences between the median ground distances being within 20%, for example 10%, of the median ground distance determined by the first row 118 indicates the edge 204 from the medium distance range 216.

In various embodiments, the medium distance range 216 may be between 20 cm and 40 cm from the edge 204, for example 30 cm.

Referring to FIG. 2D, a fourth schematic diagram 218 illustrates when the mobile robot 100 reaches a short distance range 220 from the edge 204. While the mobile robot 100 is within the short distance range 220, it may be able to detect the presence of the edge 204.

When the mobile robot 100 is within the short distance range 220 of the edge 204, it may anticipate the edge 204 once it determines it can no longer detect the ground 202 in front of the sensor within the field of view 206. The presence of the ground being lost may be defined in two different ways. The edge 204 may be detected in the short distance range 220 if the median ground distances begin to increase. In other words, each of the zones 114 in the rows of interest may detect the ground behind the edge 209 if the cliff is short enough. Alternatively, if the cliff is high enough, the presence of the ground 202 may be lost if the ToF sensor 102 is no longer receiving reflected signals off any ground. In other words, if the edge 204 is too high reflected signals off the ground behind the edge 209 may not reach the ToF sensor 102. In other words, signal transmission between the ToF sensor 102 and any ground may lost resulting in the median ground distances to fall to zero.

Figure 3:
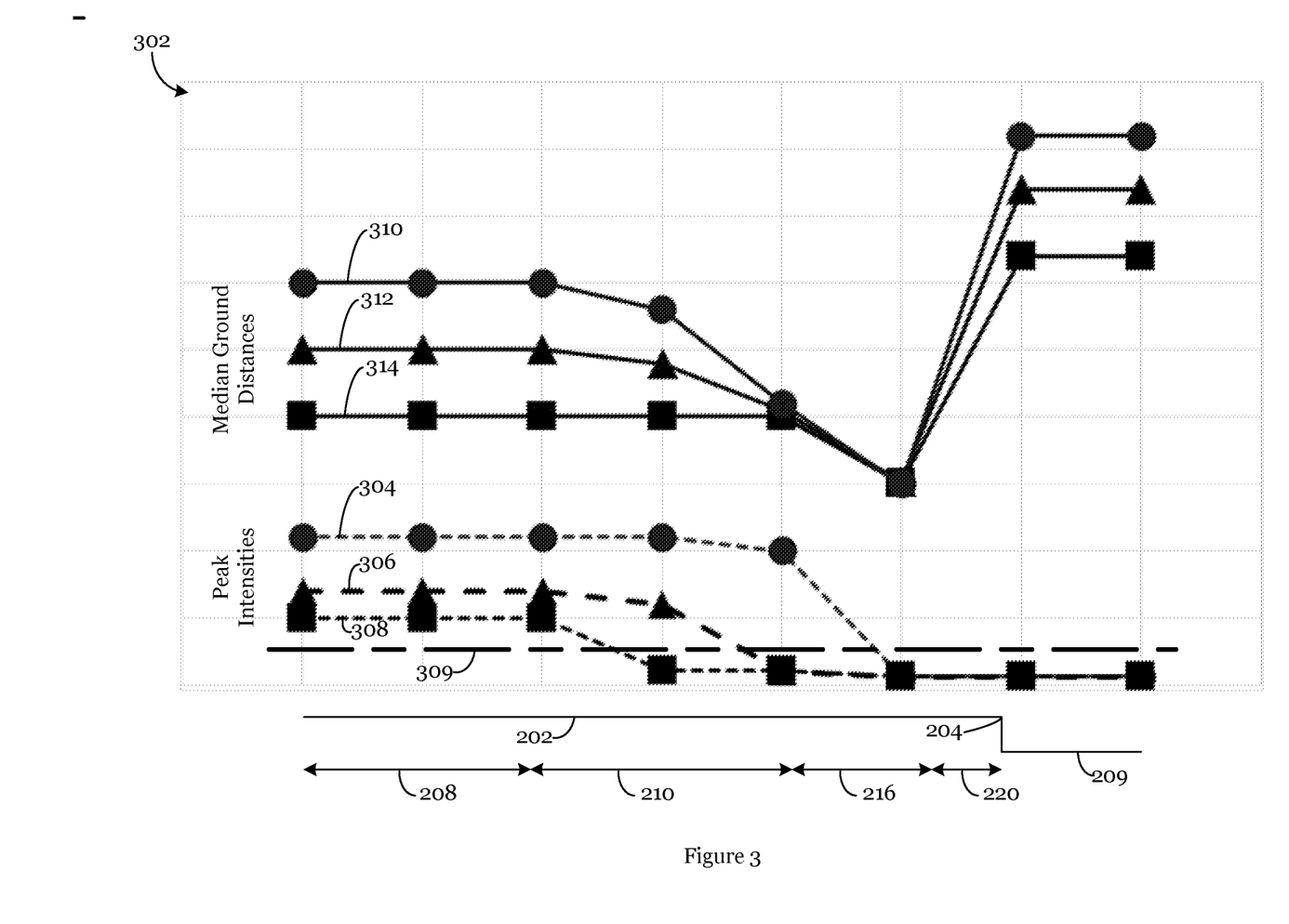
FIG. 3 illustrates a schematic diagram illustrating a graph of mobile robot detecting an edge of cliff according to an embodiment of the present application.

FIG. 3 illustrates a graphical representation of a mobile robot detecting the edge of a cliff while in motion.

Referring to FIG. 3 and as described above, the edge 204 of a cliff may be anticipated by the mobile robot 100 while it is in motion from three different ranges of distance. In various embodiments, the three ranges of distance may comprise a long distance range 210, a medium distance range 216, and a short distance range 220.

In the example illustrated in FIG. 3, the mobile robot 100 is traveling on the ground 202 towards an edge 204 of a cliff (e.g. a stair). There are no other obstacles between the mobile robot 100 and the edge 204. Therefore, FIG. 3 may be described in accordance to FIG. 2.

In various embodiments, and as described above, two different metrics may be used to detect the edge 204 from three different distances. The median distance between the rows of zones 114 in the region of interest (ROI) 116 may be used to detect the edge 204 from a short distance range 220 and a medium distance range 216. The peak intensity rate of photons received by each row of zones 114 in the ROI 116 may be used to detect the edge 204 from a long distance range 210.

Referring to graph 302, the edge 204 may be detected from a long distance range 210 based on a peak rate of intensity of reflected signals received off the ground 202 across the rows of zones 114 in the ROI 116. As understood by those with ordinary skill in the art, the controller 108 may determine an intensity of the reflected signal received by each of the zones 114 based on the rate of photons received by each of them.

In various embodiments, due to the spatial separation 124 of the rows of zones 114, while within the distance range 208, the lower the position of a row on the ToF sensor 102, the higher the intensity of the reflected signal. Therefore, a first line 304 corresponds to the peak rate of intensity of the first row 118, a second line 306 corresponds to the peak rate of intensity of the second row 120, and a third line 308 corresponds to the peak rate of intensity of the third row 122. In other words, the lower a row is on the ToF sensor 102, the higher the peak intensity rate due to its closer proximity to the ground 202.

In various embodiments, the edge 204 may be detected by comparing the peak rate of intensity of reflected signals received by each row of zones 114 versus a corresponding ambient rate 309. The ambient rate 309 is the light noise measured by the ToF sensor 102. The ambient rate 309 may be the intensity of light already in the room. In other words, the ambient rate 309 corresponds to the intensity of light received by the ToF sensor 102 that is not caused by the signals emitted by the ToF sensor 102. The ambient rate 309 accounts for external factors such as lights in a room, sunlight through a window, or the like. In other words, the ambient rate 309 may be the amount of light reflected off the ground prior to any signals being transmitted.

As the mobile robot 100 moves towards the edge 204 and the peak intensity rate of the signals reflected off the ground 202 decreases, indicating that the reflected signal off the ground is becoming weaker. A weak reflected signal off the ground 202 can indicate a change in texture or material of the ground 202, or the edge 204. Therefore, in order to detect that the decrease in the peak intensity rate of the rows of zones 114 is due to the edge 204, the peak intensity rate must be lower than the ambient rate 309. If the peak intensity rate of a row of zones 114 falls below an ambient rate, the controller 108 may determine the presence of the edge 204 from the long distance range 210.

For example, as the mobile robot 100 is approaching the edge 204 because the third row 122 is higher on the ToF sensor 102, the part of the signal reflected back to the third row 211 may be reflected by the lower ground past the edge 209. Therefore, the peak intensity rate of light received by the third row 122 may decrease first. Whereas on the other hand, the reflected signals received by the first row 118 and the second row 120 remain constant because they are being reflected off the ground 202 in front of the mobile robot 100. In other words, the third row 122 may first experience signal loss due to the edge 204 of the cliff, reducing the peak intensity sensed by the row.

Once the peak intensity of light received by the third row 122 decreases to a value below an ambient rate 309, the mobile robot 100 may determine the existence of the edge 204 from the long distance range 210. For example, when the third line 308 falls below the ambient rate 309, the presence of the edge 204 may be detected.

In the same manner described above, due to their lower positions, the peak intensity rates of the second row 120 may decrease next, and then the first row 118 may decrease last as the mobile robot 100 approaches the edge 204 from the long distance range 210. The second row 120 and first row 118 falling below the ambient rate 309 may confirm the anticipation of the edge from the long distance range 210.

In various embodiments, the controller 108 may determine the existence of the edge 204 and change the path on the mobile robot 100 solely due to the third line 308 (e.g., the highest row in the ROI 116) falling below the ambient rate 309. On the other hand, the controller 108 may require an increased probability of the presence of the edge 204 by determining that second line 306 and/or the first line 304 fall below the ambient rate 309. Also, the controller 108 may further require a determination that the edge 204 is present from the medium distance range 216 and/or the short distance range 220 before updating the path of the mobile robot 100.

In various embodiments, the edge 204 may be detected from the short distance range 220 and the medium distance range 216 based on the median ground distance of each row in the region of interest (ROI) 116.

Referring back to graph 302, as the mobile robot 100 is in motion, the ToF sensor 102 may be used to determine the distance between it and the ground 202 (i.e. the ground distance) from multiple zones. In other words, the controller 108 may determine the distance between each zone 114 and the ground 202. The ground distance for each zone 114 in the ROI 116 may be determined by measuring the amount of time it takes for transmitted signals to reflect off the ground back to the zones 114.

As described above, based on the ground distance of each zones 114, the controller 108 may determine a median ground distance of each row of zones 114 in the ROI 116. The median ground distance for a row of SPAD sensors may be the median of the ground distances measured by each SPAD sensor within each row. The median of the ground distance of each row of zones 114 may be continuously measured and analyzed as the robotic device 100 is in motion.

The controller 108 may determine and monitor the median ground distance between each row of SPAD sensors in the ROI 116 and the ground 202. Thus as illustrated in graph 302, a fourth line 310 may correspond to the median distances between the third row 122 of the ToF sensor 102 and the ground 202, a fifth line 312 may correspond to the median distances between the second row 120 and the ground 202, and a sixth line 314 may correspond to the median distances between the first row 118 and the ground 202.

As described above, while the mobile robot is within distance range 208 the ground 202 should be at a constant distance from each row of zones 114. In addition, due to the spatial separation 124 between rows of zones 114, the median ground distances between each row of SPAD sensors should increase by an equal value from bottom to top of the SPAD array. In other words, due to the spatial separation 124, each row of zones 114 should return a different median ground distance. Therefore, it can be determined that the fourth line 310, the fifth line 312, and the sixth line 314 each correspond to signals reflected off the ground 202 and not another target object sensed the third row 122, the second row 120, and the first row 118, respectively.

When the mobile robot 100 is approaching the edge 204 from the long distance range 210, the zones 114 are still sensing the ground 202 in front of it. Therefore, in the long distance range 210, there should be little to no variation in each of the median ground distances. However, as illustrated in graph 302, due to the field of view 206 beginning to detect a lower ground 202 due to the upcoming edge 204, there may be slight, but not very noticeable decreases in the median ground distances.

Once the mobile robot 100 is within a medium distance range 216 away from the edge 204, the rows of zones 114 in the region of interest (ROI) 116 may begin to detect the edge 204. When each of the rows of zones 114 in the ROI 116 begin detecting the edge 204, they all begin to decrease and converge to a same value. The median ground distances each of the zones 114 converging to a same value may indicate the edge 204 within the medium distance range 216. On the other hand, if the median ground distances of the second row 120 and the third row 122 both are within a threshold percent difference from the median ground distance of the first row 118, the controller 108 may detect the edge 204. For example, if the fourth line 310, the fifth line 312, and the sixth line 314 converge to a same value, or the fourth line 310 and the fifth line 312 are within the threshold percent difference of the sixth line 314, the controller 108 may determine it is detecting the edge 204. The threshold percent difference may be less than or equal to 20%, for example 10%. In other words, based on the threshold value, the edge 204 may be anticipated anywhere within the medium distance range 216. The higher the threshold value, the earlier the edge may be detected. However, a higher threshold value may reduce the probability that the edge is actually present. Therefore, there is a trade-off between the threshold percentage and the probability that the edge is present.

Referring back to graph 302, the presence of the edge 204 may be detected from the short distance range 220 based on the presence of the ground 202. In other words, the ground no longer being detected may be indicative of the approaching edge 204. In various embodiments, the ground 202 not being present may be determined in two ways based on the height of the cliff.

In a first way, it may be determined by that the presence of the ground is lost due to the median ground distances increasing because they are detecting the ground past the edge 209 if the cliff is sufficiently short. As shown in graph 302, because the cliff is sufficiently short, in the short distance range 220, the fourth line 310, the fifth line 312, and the sixth line 314 may all increase because the lower ground past the edge 209 is being detected. In other words, the increasing median ground distances may indicate that the ground is no longer being detected.

On the other hand the presence of the ground may be lost if the median ground distances are lost due to a high cliff. In other words, if the edge 204 is high enough reflected signals may not be able to reach the ToF sensor 102.

However, in some instances when the mobile robot 100 is within the long distance range 210 from the edge, it may temporarily detect the lower ground past the edge 209. Therefore, within the long distance range 210 the presence of the ground may be lost. In other words, in the long distance range 210 the median ground distances may increase, or if the cliff is high, enough reflected signals off the ground 202 may not be detected for a temporary period of time. In other words, the median ground distance may temporarily increase or be lost even though the mobile robot 100 is in the long distance range 210. Therefore, in order to ensure the presence of the ground being lost is not a false detection, the peak rate of the intensity values may be compared to the ambient rate 309. In other words, if each of the peak intensity values of the ROI 116 are below the ambient rate and the presence of the ground 202 is lost indicates the presence of the edge 204. On the other hand if each of the peak intensity values in region rows of interest (ROI) 116 are not below the ambient rate 309 may indicate to the mobile robot 100 is in the long distance range 210 and is not detecting the edge 204 from the short distance range 220.

For example, referring back to graph 302 once the median ground distances reach a value greater than the median ground distance in distance range 208, the edge 204 may be detected from the short distance range 220.

Figure 4:
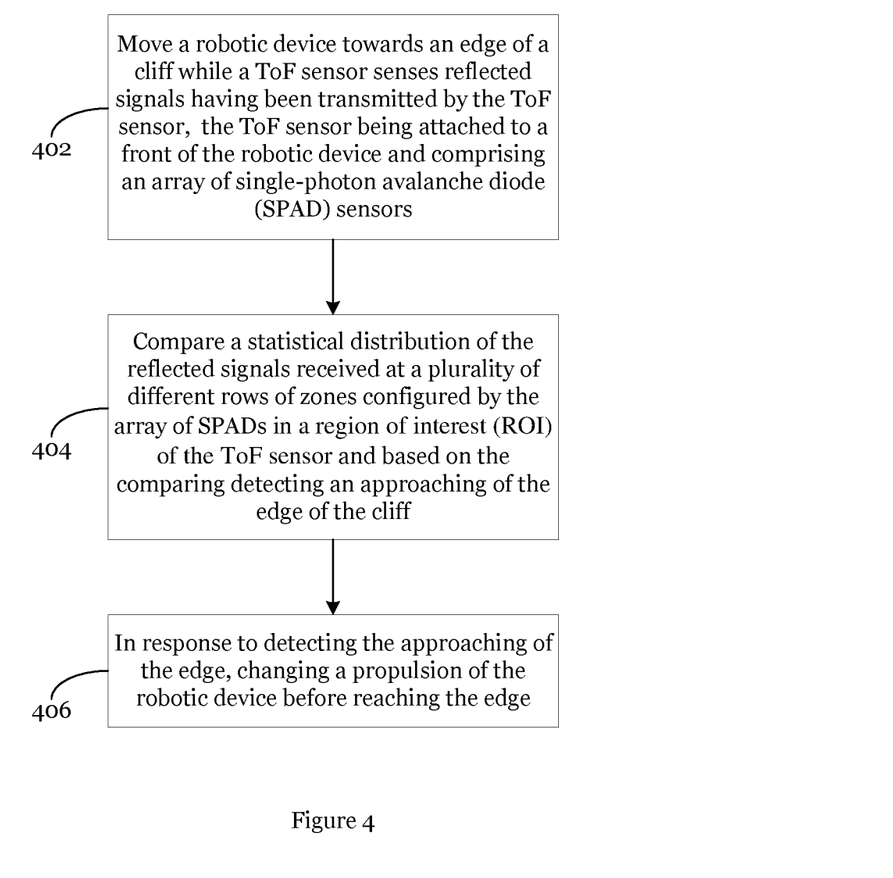
FIG. 4 illustrates a process flow for anticipating an edge of a cliff from three different distance ranges according to an embodiment of the present application.

FIG. 4 illustrates a process flow for anticipating an edge of a cliff from three different distance ranges according to an embodiment of the present application.

As illustrated in block 402 and described with reference to FIGS. 1A-1C a mobile robot 100 may be moved towards an edge of a cliff. As the mobile robot 100 approaches the edge of the cliff, a time of flight (ToF) sensor 102 receives reflected signals that are transmitted by the ToF sensor 102. The ToF sensor 102 may be attached to the front of the mobile robot 100 and comprise an array of single-photon avalanche diode (SPAD) sensors 114.

As next illustrated in block 404 and described with reference to FIGS. 2-3, a statistical distribution of the reflected signals received at a plurality different rows of the array of zones 114 in a region of interest (ROI) 116 of the ToF sensor 102 may be compared. Based on the comparing of the statistical distribution the reflected signals an approaching edge 204 of a cliff may be detected.

As described above, the peak rate of the intensity of the reflected signals received by the rows in the ROI 116 may be used to detect the approaching edge 204 of the cliff from the long distance range 210. The approaching edge 204 may be detected from the medium distance range 216 and the short distance range based on the median ground distance of the rows in the ROI 116. The approaching edge 204 of the cliff may be determined in the same manner described in FIGS. 2-3.

In various embodiments, the edge 204 may be considered detected

As next illustrated in block 406, based on detecting the approaching edge 204 of the cliff, the path of the mobile robot 100 may be change such that a propulsion of the mobile robot 100 changes before reaching the edge 204.

In various embodiments, the path of the mobile robot 100 may be changed based on the edge 204 being detected from at least one of the three distance ranges. In other embodiments, the path may be changed if the edge 204 is detected from two out of three distance ranges or from all three distance ranges.

Figure 5:
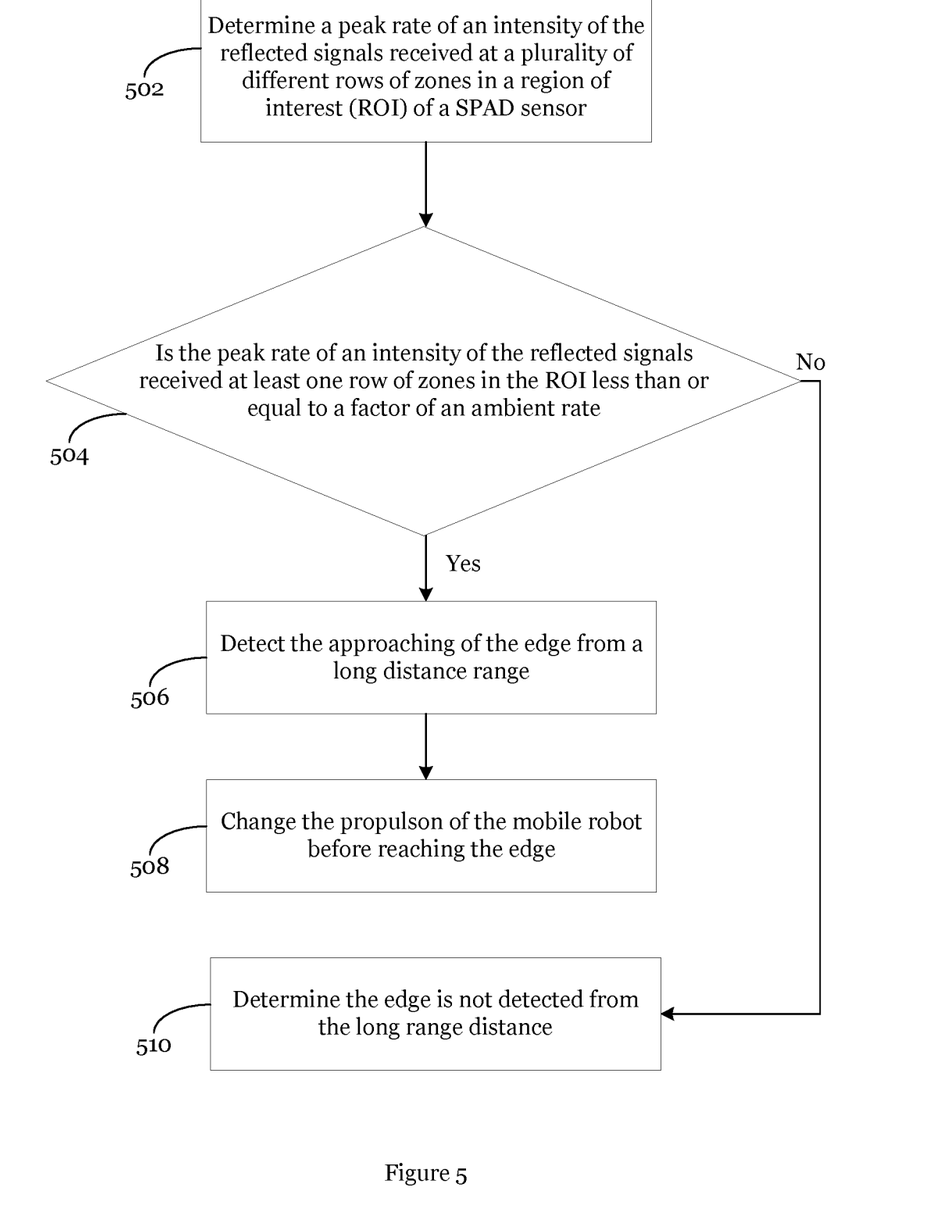
FIG. 5 illustrates a process flow for anticipating an edge of a cliff from a long distance range according to an embodiment of the present application.

FIG. 5 illustrates a process flow for anticipating an edge of a cliff from a long distance range according to an embodiment of the present application.

As illustrated in block 502 and described with reference to FIGS. 2-3, a peak rate of the intensity of the reflected signals received at the plurality of different rows of zones 114 in the region of interest (ROI) 116 of the ToF sensor 102 may be determined. The peak rate of the intensity may be continuously determined and monitored while the mobile robot 100 is in motion.

As illustrated in block 504 and described with reference to FIGS. 2-3, whether a peak rate of the intensity of the reflected signals received of at least one row of the zones 114 in the ROI 116 is less than or equal to an ambient rate 309 is determined.

If the peak rate of the intensity of the reflected signals of at least one row in the ROI 116 falls below the ambient rate 309, the edge 204 is detected from the long distance range 210 and the method proceeds to blocks 506-508. On the other hand, if the peak rate of the intensity of the reflected signals of at least one row does not fall below an ambient rate, the method proceeds to block 510 and edge 204 is not detected from the long distance range 210.

As next illustrated in blocks 506-508 and described with reference to FIGS. 2-3, if the peak rate of the intensity of at least one row in the ROI 116 falls below the ambient rate, the edge 204 of the cliff may be detected from the long distance range 210. Then, in response to detecting the edge 204 from the long distance range 210, the path of the mobile robot 100 is edited so that it changes its propulsion before it reaches the edge.

On the other hand, if the peak rate of the intensity of at least one row in the ROI 116 does not fall below the ROI 116, the method proceeds to block 510 and the edge 204 is not detected from the long distance range 210. Thus, the mobile robot 100 may continue its propulsion along its current path.

In some embodiments, in order to detect the edge of the cliff from the long distance range 210 the peak rate of the intensity of more than one row in the ROI 116 may fall below an ambient rate to determine the edge 204 from the long distance range 210. In other embodiments, the peak rate of the intensity of a portion or all rows in the ROI 116 may fall below an ambient rate to detect the edge 204 of the cliff.

Figure 6:
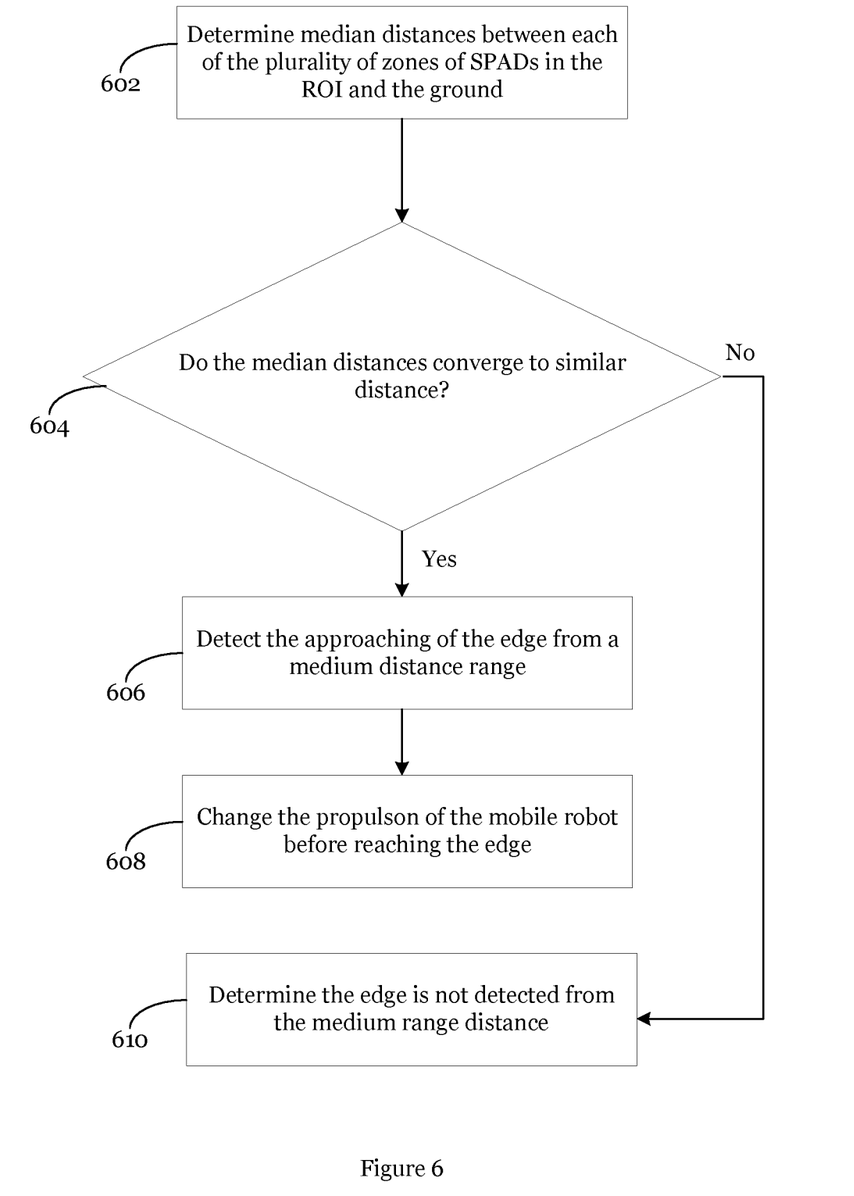
FIG. 6 illustrates a process flow for anticipating an edge of a cliff from a medium distance range according to an embodiment of the present application.

FIG. 6 illustrates a process flow for anticipating an edge of a cliff from a medium distance range according to an embodiment of the present application.

As illustrated in block 602 and described with reference to FIGS. 2-3 median distances between each row of zones 114 in the region of interest (ROI) 116 of the ToF sensor 102 (i.e. the median ground distances) may be determined. The median ground distances may be continuously determined and monitored while the mobile robot 100 is in motion.

As illustrated in block 604 and described with reference to FIGS. 2-3, whether the median distances converge to a similar distance may be determined.

If the median distances coverage to a similar distance, the edge 204 is detected from the medium distance range 216, and the method proceeds to blocks 606-608. On the other hand, if the median distances do not converge to a same value, the method proceeds to block 610 and the edge 204 is not detected from the medium distance range 216.

As next illustrated in blocks 606-608 and described with reference to FIGS. 2-3, if the median distances converge to a similar distance, the edge 204 of the cliff may be detected from the medium distance range 216. Then, in response to detecting the edge 204 from the medium distance range 216, the path of the mobile robot 100 is edited so that it changes its propulsion before it reaches the edge 204.

In some embodiments, the median distances may be considered to converge to similar distance if the differences between each of the ground distances in the ROI 116 are within a threshold percent difference of the median ground distance detected by the lowest zone in the ROI 116. For example the threshold percent difference may a percentage less than 20%. For example, if the median ground distance detected by the second row 120 and the third row 122 are within at least 20% of the median ground distance detected by the first row 118, the controller 108 may determine it is anticipating the edge 204.

On the other hand, if the median distances do not converge to a similar distance, the method proceeds to block 610 and the edge 204 is not detected from the medium distance range 216. Thus, the mobile robot 100 may continue its propulsion along its current path.

Figure 7:
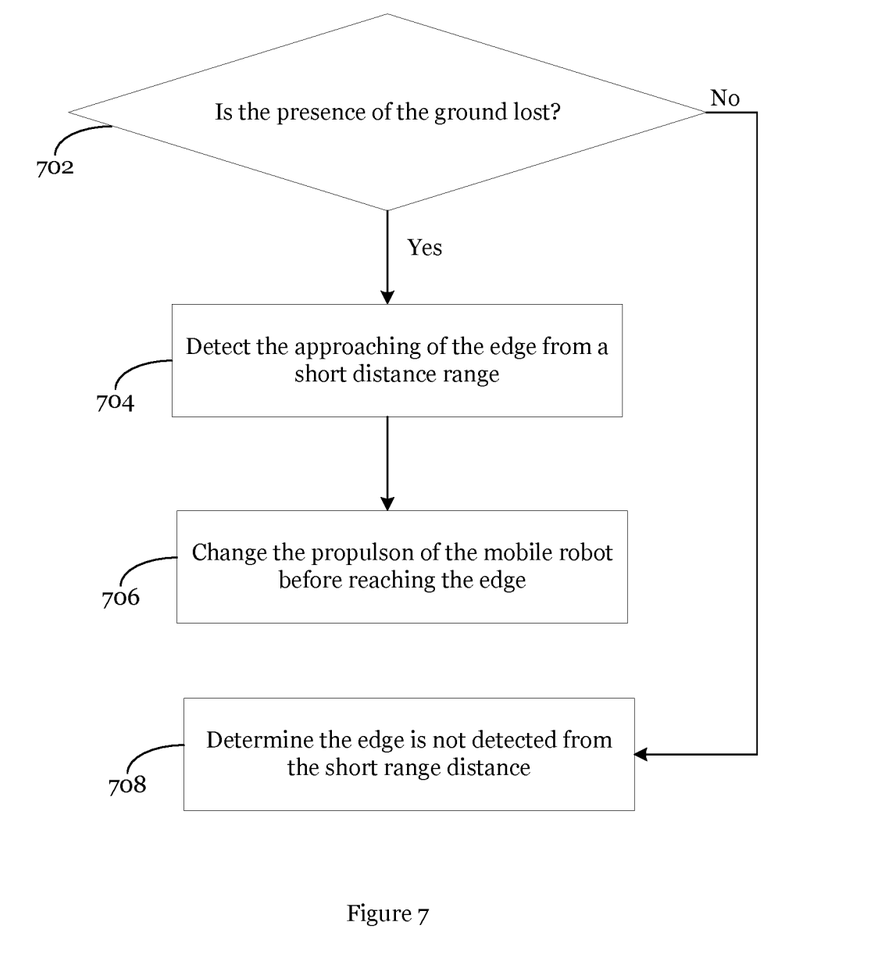
FIG. 7 illustrates a process flow for anticipating an edge of a cliff from a short distance range according to an embodiment of the present application.

FIG. 7 illustrates a process flow for anticipating an edge of a cliff from a short distance range according to an embodiment of the present application.

As illustrated in block 702 and described with reference to FIGS. 2-3, whether the each row of zones 114 in the ROI 116 lost a presence of the ground 202 may be determined.

If the presence of the ground 202 is lost, the edge 204 is detected from the short distance range 220, and the method proceeds to blocks 704-706. On the other hand, if the presence of the ground 202 is not lost, the method proceeds to block 708 and the edge 204 is not detected from the short distance range 220.

In various embodiments, as described above, the presence of the ground being lost may be determined based on the median ground distances in the ROI 116. In one embodiments, the presence of the ground being lost may be determined by the median ground distances falling to zero because the ROI 116 is not able to receive signals reflected off the ground past the edge 209 because the cliff is very high.

In other embodiments, the presence of the ground being lost may be determined by the median ground distances increasing to value greater than the distance between the ToF sensor 102 and the ground 202. However, as described above, in certain instances, the median ground distances may also increase if the mobile robot 100 temporarily detects the ground past the edge 209 prior to reaching the short distance range 220 or the field of view 206 is blocked by an obstacle. Therefore, in order to detect the edge 204 from the short distance range 220 if the median ground distances increase also requires that each of the peak rate of the intensity of the reflected signals received by each row in the ROI 116 to fall below an ambient rate 309.

As next illustrated in blocks 704-706 and described with reference to FIGS. 2-3, if the presence of the ground 202 is lost, the edge 204 of the cliff may be detected from the short distance range 220. Then, in response to detecting the edge 204 from the short distance range 220, the path of the mobile robot 100 is edited so that it changes its propulsion before it reaches the edge 204.

On the other hand, if the presence of the ground 202 is lost, the method proceeds to block 708 and the edge 204 is not detected from the short distance range 220. Thus, the mobile robot 100 may continue its propulsion along its current path.

Example embodiments of the invention are summarized here. Other embodiments can also be understood from the entirety of the specification as well as the claims filed herein.

Example 1. A method of operating a robotic device, the method including: moving the robotic device towards an edge of a cliff while a ToF sensor senses reflected signals having been transmitted by the ToF sensor, the reflected signals being generated by the signals transmitted by the ToF sensor being reflected off a target object back to the ToF sensor, the ToF sensor being attached to a front of the robotic device and including an array of single-photon avalanche diode (SPAD) sensors; comparing a statistical distribution of the reflected signals received at a plurality of different rows of zones configured by the array of SPADs in a region of interest (ROI) of the ToF sensor and based on the comparing detecting an approaching of the edge of the cliff; and in response to detecting the approaching of the edge, changing a propulsion of the robotic device before reaching the edge.

Example 2. The method of example 1, where detecting the approaching of the edge includes: determining a peak rate of an intensity of the reflected signals received at a plurality of different rows of zones in the ROI; and in response to determining that the peak rate of an intensity of the reflected signals received at least one row of zones in the ROI decreases to a factor below a corresponding ambient rate, detecting the approaching of the edge from a long distance range.

Example 3. The method of one of examples 1 or 2, where detecting the approaching of the edge includes: determining median distances based on a time difference between the signals being transmitted by the ToF sensor and the reflected signals being reflected off a ground being received for each of the plurality of different rows of zones in the ROI; and in response to determining that the median distances each converge to a same value, detecting the approaching of the edge from a medium distance range.

Example 4. The method of one of examples 1 to 3, where the plurality of different rows of zones in the ROI are a bottom three rows of zones configured by the array of SPADs.

Example 5. The method of one of examples 1 to 4, where detecting the approaching of the edge includes: determining that plurality of different rows of zones in the ROI lost a presence of a ground; and in response to determining that plurality of different rows of zones in the ROI lost the presence of the ground, detecting the approaching of the edge from a short distance range.

Example 6. The method of one of examples 1 to 5, where the ToF sensor is also used for object detection, wall tracking, and simultaneous localization and mapping (SLAM).

Example 7. The method of one of examples 1 to 6, where the array of SPAD sensors includes eight rows of SPAD sensors and eight columns of SPAD sensors.

Example 8. A method for operating a robotic device, the method including: transmitting signals from an array of SPAD sensors while the robotic device is in motion, the array of SPAD sensors being attached to a front of the robotic device; receiving reflected signals by a plurality of zones configured by the array of SPADs while the robot is in motion, the reflected signals being generated by the transmitted signals being reflected off of a target to the array of SPADs; detecting an approaching edge of a cliff from three different ranges of distance while the robotic device is in motion based on a statistical distribution of the reflected signals; and in response to detecting the approaching edge of a cliff from at least one of the three ranges of distance, changing a path of the robotic device.

Example 9. The method of example 8, where the three different ranges of distance include a short distance range, a medium distance range, and a long distance range.

Example 10. The method of one of examples 8 or 9, where the three different ranges of distance includes a short distance range, and detecting the edge of the cliff from the short distance range includes: determining that plurality of different rows of zones included in a region of interest (ROI) of the SPAD array lost a presence of a ground; and in response to determining that plurality of different rows of zones in the ROI lost the presence of the ground, detecting the approaching of the edge from a short distance range.

Example 11. The method of one of examples 8 to 10, where the three different ranges of distance includes a medium distance range, and detecting the edge of the cliff from the medium range distance includes: determining median distances between each row of a plurality of different rows of zones included in a region of interest (ROI) of the SPAD array and a ground based on a time difference between the signals being transmitted by the SPAD array and the reflected signals reflected off the ground being received by each of the plurality of different rows of zones; and in response to determining that the median distances each converge to a same value, detecting the approaching of the edge from a medium range distance.

Example 12. The method of one of examples 8 to 11, where the three different ranges of distance includes a long distance range, and detecting the edge of the cliff from the long distance range includes: determining a peak rate of an intensity of the reflected signals received at a plurality of different rows of zones in a region of interest (ROI) of the SPAD array; and in response to determining that the peak rate of an intensity of the reflected signals received by at least one row of zones in the ROI decreases to a factor below a corresponding ambient rate, detecting the approaching of the edge from a long distance range.

Example 13. The method of one of examples 8 to 12, where the array of SPAD sensors are included in a time of flight (ToF) sensor, and the ToF sensor is also used for object detection, wall tracking, and simultaneous localization and mapping (SLAM).

Example 14. A robotic device including: a time of flight (ToF) sensor including an array of SPAD sensors attached to a front robotic device; a controller; and a memory for storing a program to be executed in the controller, the program including instructions when executed cause the controller to: move the robotic device towards an edge of a cliff while the ToF sensor senses reflected signals having been transmitted by the ToF sensor, the reflected signals being generated by the signals transmitted by the ToF sensor being reflected off a target object back to the ToF sensor; compare a statistical distribution of the reflected signals received at a plurality of different rows of zones configured by the array of SPADs in a region of interest (ROI) of the ToF sensor and based on the comparing detecting an approaching of the edge of the cliff; and in response to detecting the approaching of the edge, change a propulsion of the robotic device before reaching the edge Example 15. The robotic device of example 14, where instructions to detect the approaching of the edge from a long range distance further include instructions to: determine a peak rate of an intensity of the reflected signals received at a plurality of different rows of zones in the ROI; and in response to determining that the peak rate of an intensity of the reflected signals received at least one row of zones in the ROI decreases to a factor below a corresponding ambient rate, detect the approaching of the edge from a long distance range Example 16. The robotic device of one of examples 14 or 15, where the array of SPAD sensors includes eight rows of SPAD sensors and eight columns of SPAD sensors.

Example 17. The robotic device of one of examples 14 to 16, where instructions to detect the approaching of the edge from a medium range distance further include instructions to: determine median distances based on a time difference between the signals being transmitted by the ToF sensor and the reflected signals being reflected off a ground being received for each of the plurality of different rows of zones in the ROI; and in response to determining that the median distances each converge to a same value, detecting the approaching of the edge from a medium distance range.

Example 18. The robotic device of one of examples 14 to 17, where the ROI includes a bottom three rows of zones.

Example 19. The robotic device of one of examples 14 to 18, where instructions to detect the approaching of the edge from a short range distance further include instructions to: determine that plurality of different rows of zones in the ROI lost a presence of a ground; and in response to determining that plurality of different rows of zones in the ROI lost the presence of the ground, detecting the approaching of the edge from a short distance range Example 20. The robotic device of one of examples 14 to 19, where the ToF sensor is also used for object detection, wall tracking, and simultaneous localization and mapping (SLAM).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a robotic device, the method comprising:
   moving the robotic device towards an edge of a cliff while a time of flight (ToF) sensor senses reflected signals having been transmitted by the ToF sensor, the reflected signals being generated by signals transmitted by the ToF sensor being reflected off a target object back to the ToF sensor, the ToF sensor being attached to a front of the robotic device and comprising an array of single-photon avalanche diode (SPAD) sensors;
   comparing a statistical distribution of the reflected signals received at a plurality of different rows of zones configured by the array of SPAD sensors in a region of interest (ROI) of the ToF sensor and based on the comparing detecting an approaching of the edge of the cliff, the comparing comprising identifying a convergence of an intensity of the reflected signals or of a median distance to a ground; and
   in response to detecting the approaching of the edge, changing a propulsion of the robotic device before reaching the edge.

2. The method of claim 1, wherein identifying the convergence comprises:
   determining a peak rate of the intensity of the reflected signals received at the plurality of different rows of zones in the ROI; and
   in response to determining that the peak rate of an intensity of the reflected signals received at least one row of zones in the ROI decreases to a factor below a corresponding ambient rate, detecting the approaching of the edge.

3. The method of claim 1, wherein identifying the convergence comprises:
   determining the median distances based on a time difference between the signals being transmitted by the ToF sensor and the reflected signals being reflected off the ground being received for each of the plurality of different rows of zones in the ROI; and
   in response to determining that the median distances each converge to a same value, detecting the approaching of the edge.

4. The method of claim 3, wherein the plurality of different rows of zones in the ROI are a bottom three rows of zones configured by the array of SPAD sensors.

5. The method of claim 1, wherein detecting the approaching of the edge comprises:
   determining that plurality of different rows of zones in the ROI lost a presence of a ground; and
   in response to determining that plurality of different rows of zones in the ROI lost the presence of the ground, detecting the approaching of the edge.

6. The method of claim 1, wherein the ToF sensor is also used for object detection, wall tracking, and simultaneous localization and mapping (SLAM).

7. The method of claim 1, wherein the array of SPAD sensors comprises eight rows of SPAD sensors and eight columns of SPAD sensors.

8. A method for operating a robotic device, the method comprising:
   transmitting signals from an array of SPAD sensors while the robotic device is in motion, the array of SPAD sensors being attached to a front of the robotic device;
   receiving reflected signals by a plurality of zones configured by the array of SPAD sensors while the robotic device is in motion, the reflected signals being generated by the transmitted signals being reflected off of a target to the array of SPAD sensors;
   detecting an approaching edge of a cliff from three different ranges of distance while the robotic device is in motion based on a statistical distribution of the reflected signals, wherein detecting the approaching edge of the cliff comprises identifying a convergence in an attribute of the reflected signals; and
   in response to detecting the approaching edge of a cliff from at least one of the three different ranges of distance, changing a path of the robotic device.

9. The method of claim 8, wherein the three different ranges of distance comprise a short distance range, a medium distance range, and a long distance range, the long distance range being furthest to the cliff and the short distance range being closest to the cliff.

10. The method of claim 8, wherein detecting the edge of the cliff comprises:
    determining that plurality of different rows of zones included in a region of interest (ROI) of the array of SPAD sensors lost a presence of a ground; and
    in response to determining that plurality of different rows of zones in the ROI lost the presence of the ground, detecting the approaching of the edge.

11. The method of claim 8, wherein the attribute comprise median distances of the array of SPAD sensors to a ground and wherein identifying the convergence comprises:
    determining the median distances between each row of a plurality of different rows of zones included in a region of interest (ROI) of the array of SPAD sensors and the ground based on a time difference between the transmitted signals being transmitted by the array of SPAD sensors and the reflected signals reflected off the ground being received by each of the plurality of different rows of zones; and
    in response to determining that the median distances each converge to a same value, detecting the approaching of the edge.

12. The method of claim 8, wherein the attribute comprise a peak rate of an intensity of the reflected signals received at the array of SPAD sensors and wherein identifying the convergence comprises:
    determining the peak rate of the intensity of the reflected signals received at a plurality of different rows of zones in a region of interest (ROI) of the array of SPAD sensors; and
    in response to determining that the peak rate of an intensity of the reflected signals received by at least one row of zones in the ROI decreases to a factor below a corresponding ambient rate, detecting the approaching of the edge.

13. The method of claim 8, wherein the array of SPAD sensors are included in a time of flight (ToF) sensor, and the ToF sensor is also used for object detection, wall tracking, and simultaneous localization and mapping (SLAM).

14. A robotic device comprising:
    a time of flight (ToF) sensor comprising an array of SPAD sensors attached to a front robotic device;
    a controller; and
    a memory for storing a program to be executed in the controller, the program comprising instructions when executed cause the controller to:
    move the robotic device towards an edge of a cliff while the ToF sensor senses reflected signals having been transmitted by the ToF sensor, the reflected signals being generated by signals transmitted by the ToF sensor being reflected off a target object back to the ToF sensor;

compare a statistical distribution of the reflected signals received at a plurality of different rows of zones configured by the array of SPADs in a region of interest (ROI) of the ToF sensor and based on the comparing detecting an approaching of the edge of the cliff, the instructions to compare comprising instructions to identify a convergence of an intensity of the reflected signals or of a median distance to a ground; and in response to detecting the approaching of the edge, change a propulsion of the robotic device before reaching the edge.

15. The robotic device of claim 14, wherein instructions to identify the convergence further comprise instructions to:

determine a peak rate of an intensity of the reflected signals received at the plurality of different rows of zones in the ROI; and in response to determining that the peak rate of an intensity of the reflected signals received at least one row of zones in the ROI decreases to a factor below a corresponding ambient rate, detect the approaching of the edge.

16. The robotic device of claim 14, wherein the array of SPAD sensors comprises eight rows of SPAD sensors and eight columns of SPAD sensors.

17. The robotic device of claim 14, wherein instructions to identify the convergence further comprise instructions to:

determine the median distances based on a time difference between the signals being transmitted by the ToF sensor and the reflected signals being reflected off the ground being received for each of the plurality of different rows of zones in the ROI; and in response to determining that the median distances each converge to a same value, detecting the approaching of the edge.

18. The robotic device of claim 17, wherein the ROI comprises a bottom three rows of zones.

19. The robotic device of claim 14, wherein instructions to detect the approaching of the edge further comprise instructions to:

determine that plurality of different rows of zones in the ROI lost a presence of a ground; and in response to determining that plurality of different rows of zones in the ROI lost the presence of the ground, detecting the approaching of the edge.

20. The robotic device of claim 19, wherein the ToF sensor is also used for object detection, wall tracking, and simultaneous localization and mapping (SLAM).

21. The method of claim 9, wherein the attribute comprise median distances of the array of SPAD sensors to a ground or a peak rate of an intensity of the reflected signals received at the array of SPAD sensors;

wherein detecting the edge of the cliff from the short distance range comprises determining that plurality of different rows of zones included in a region of interest (ROI) of the array of SPAD sensors lost a presence of a ground; and in response to determining that plurality of different rows of zones in the ROI lost the presence of the ground, detecting the approaching of the edge from the short distance range;

wherein detecting the edge of the cliff from the medium distance range comprises determining the median distances between each row of a plurality of different rows of zones included in a region of interest (ROI) of the array of SPAD sensors and the ground based on a time difference between the transmitted signals being transmitted by the array of SPAD sensors and the reflected signals reflected off the ground being received by each of the plurality of different rows of zones; and in response to determining that the median distances each converge to a same value, detecting the approaching of the edge from the medium distance range; and wherein detecting the edge of the cliff from the long distance range comprises:

determining the peak rate of the intensity of the reflected signals received at a plurality of different rows of zones in a region of interest (ROI) of the array of SPAD sensors; and in response to determining that the peak rate of an intensity of the reflected signals received by at least one row of zones in the ROI decreases to a factor below a corresponding ambient rate, detecting the approaching of the edge from the long distance range.

* * * * *